US010099933B2

(12) United States Patent
Parvulescu et al.

(10) Patent No.: US 10,099,933 B2
(45) Date of Patent: *Oct. 16, 2018

(54) POST-TREATMENT OF DEBORONATED MWW ZEOLITE

(71) Applicant: BASF SE, Ludwigshafen (DE)

(72) Inventors: Andrei-Nicolae Parvulescu, Ruppertsberg (DE); Jeff Yang, Glen Rock, NJ (US); Stefan Maurer, Shanghai (CN); Manuela Gaab, Heidelberg (DE); Karsten Seidel, Mannheim (DE); Olga Gerlach, Ludwigshafen (DE); Ulrich Mueller, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/435,588

(22) PCT Filed: Oct. 9, 2013

(86) PCT No.: PCT/EP2013/071042
§ 371 (c)(1),
(2) Date: Apr. 14, 2015

(87) PCT Pub. No.: WO2014/060261
PCT Pub. Date: Apr. 24, 2014

(65) Prior Publication Data
US 2015/0329368 A1    Nov. 19, 2015

(30) Foreign Application Priority Data
Oct. 18, 2012  (EP) .................................. 12189042

(51) Int. Cl.
*C01B 39/48* (2006.01)
*B01J 35/00* (2006.01)
*C01B 39/02* (2006.01)
*B01J 29/70* (2006.01)

(52) U.S. Cl.
CPC ........... *C01B 39/48* (2013.01); *B01J 29/7038* (2013.01); *B01J 35/002* (2013.01); *C01B 39/026* (2013.01); *B01J 2229/16* (2013.01); *B01J 2229/37* (2013.01); *B01J 2229/40* (2013.01)

(58) Field of Classification Search
None
See application file for complete search history.

(56) References Cited

U.S. PATENT DOCUMENTS

| 4,622,166 A * | 11/1986 | Nakazawa | C11D 3/1286 252/179 |
| 5,573,585 A * | 11/1996 | Lauth | C01B 37/04 106/400 |
| 7,326,401 B2 * | 2/2008 | Tatsumi | C01B 37/005 423/702 |
| 2002/0164283 A1 | 11/2002 | Jones et al. | |
| 2005/0169836 A1 | 8/2005 | Jones et al. | |
| 2008/0027256 A1 * | 1/2008 | Roth | B01J 29/7038 585/467 |
| 2009/0325790 A1 * | 12/2009 | Haller | C01B 37/005 502/241 |
| 2011/0313179 A1 * | 12/2011 | Kawabata | C07D 301/12 549/531 |

FOREIGN PATENT DOCUMENTS

| CN | 1796279 A | 7/2006 |
| EP | 0 013 433 A1 | 7/1980 |
| WO | WO 02/057181 A2 | 7/2002 |
| WO | WO 2009/016153 A2 | 2/2009 |

OTHER PUBLICATIONS

International Search Report dated Dec. 11, 2013 in PCT/EP2013/071042 filed Oct. 9, 2013.
Yoshihiro Kubota, et al., "Organic-silicate hybrid catalysts based on various defined structures for Knoevenagel condensation" Microporous and Mesoporous Materials, vol. 70, No. 1-3, XP004506232, May 21, 2004, pp. 135-149.
A. Corma, et al., "Synthesis and characterization of the MCM-22 zeolite" Zeolites, vol. 15, No. 1, XP004033780, Jan. 1, 1995, pp. 2-8.
P. Matias, et al., "Effect of dealumination by acid treatment of a HMCM-22 zeolite on the acidity and activity of the pore systems" Applied Catalysis A: General, vol. 365, No. 2, XP026393395, Aug. 31, 2009, pp. 207-213.
M. Kollar, et al., "Micro/mesoporous aluminosilicate composites from zeolite MCM-22 precursor" Microporous and Mesoporous Materials, vol. 99, No. 1-2, XP005823577, Jan. 18, 2007, pp. 37-46.
Search Report issued in Chinese Application No. 2013800659008 filed on Oct. 9, 2013, pp. 36-37.
Fine Chemical Intermediates, Dec. 31, 2012, vol. 32, No. 6.
C.W. Jones et al, Chemistry of Materials, "Synthesis of Hydrophobic Molecular Sieves by Hydrothermal Treatment with Acetic Acid", Jan. 23, 2001, pp. 1041-1050.

* cited by examiner

*Primary Examiner* — Sheng Han Davis
(74) *Attorney, Agent, or Firm* — Oblon, McClelland, Maier & Neustadt, L.L.P.

(57) ABSTRACT

A process for the post-treatment of a zeolitic material having an MWW framework structure, the process comprising (i) providing a zeolitic material having an MWW framework structure, wherein the framework structure of the zeolitic material comprises $X_2O_3$ and $YO_2$, wherein Y is a tetravalent element and X is a trivalent element and wherein the molar ratio $X_2O_3{:}YO_2$ is greater than 0.02:1; (ii) treating the zeolitic material provided in (i) with a liquid solvent system thereby obtaining a zeolitic material having a molar ratio $X_2O_3{:}YO_2$ of at most 0.02:1, and at least partially separating the zeolitic material from the liquid solvent system; (iii) treating the zeolitic material obtained from (ii) with a liquid aqueous system having a pH in the range of 5.5 to 8 and a temperature of at least 75° C.

29 Claims, No Drawings

POST-TREATMENT OF DEBORONATED MWW ZEOLITE

This application is a 371 of PCT/EP 2013/071042 filed Oct. 9$^{th}$, 2013 and European Patent EP 12189042 filed Oct. 18$^{th}$, 2012. The subject matter of each of the above-referenced applications is incorporated in entirety by reference.

The present invention relates to a process for the post-treatment of a zeolitic material having a MWW framework structure comprising $X_2O_3$ and $YO_2$, wherein a zeolitic material having a MWW framework structure is provided and then subjected to a treatment with a liquid solvent system followed by a treatment with a liquid aqueous system. Further, the present invention relates to a zeolitic material obtained or obtainable by this process. Also, the present invention relates to the use of said zeolitic material, in particular as a catalyst precursor.

Zeolites are widely used in the chemical industry, for example as heterogeneous catalysts for various chemical and petrochemical processes. Generally, zeolites are crystalline alumosilicates having microporous structure. Their special properties, among others, are attributed to their porous structure, usually a regular pore system of molecular dimensions, and their specific chemical composition. There are many known zeolites structures, either naturally occuring zeolites or synthesized zeolites, which can be applied as heterogeneous catalysts for many types of applications.

In order to modify the properties of zeolitic materials such as their structure or their composition, post-treatment methods can be applied. The most common post-treatment methods described in the literature are steam treatments, acid treatments, or basic treatments.

Steam treatment is often used to enhance the activity and stability of the zeolite for various selective reactions. EP 0 013 433 A1, for example, teaches the use of steam treatment to increase the activity of a zeolite by increasing the Si/Al ratio. This steam treatment not only influences the Si/Al ratio, but also has an impact on the acidic/basic properties and the hydrophilicity/hydrophobicity of the zeolite.

Acid treatment may have a similar effect, and it may also result in the change of the framework composition. For example, WO 02/057181 A2 describes the deboronation of a silicate wherein an acid is employed for the deboronation stage. According to the specific examples of this document, glacial acetic acid is employed, and according to conceivable embodiments which are not further concretized, hydrochloric acid, sulfuric acid, nitric acid, phosphoric acid, formic acid, acetic acid, propionic acid, oxalic acid, and tartaric acid are described.

WO 2009/016153 A2 describes a combination of steam treatment and acid treatment. According to this document, phosphorus-modified molecular sieves are subjected to a steam treatment at high temperatures before a leaching step with an acidic solution is carried out to remove Al from the zeolitic material.

Both the steam treatment and the acid treatment may have a significant influence on the properties of the zeolitic material. By subjecting a zeolitic material comprising both trivalent and tetravalent structural components X and Y as $X_2O_3$ and $YO_2$, respectively, to a steam treatment and/or an acid treatment, the molar ratio $X_2O_3:YO_2$ is decreased. However, it was found that also the crystallinity of the zeolitic materials is decreased by the steam treatment and/or acid treatment, and further, that the hydrophobicity of the zeolitic materials respectively decreases. Therefore, both the steam treatment and the acid treatment may result in a partial transformation of the crystalline material into an amorphous material.

Thus, it was an object of the present invention to provide a process for the post-treatment of a zeolitic material which does not exhibit said disadvantage.

Further, it was an object of the present invention to provide a post-treated zeolitic material having a low molar ratio $X_2O_3:YO_2$ and simultaneously a high crystallinity.

It was surprisingly found that a post-treatment process which includes subjecting a zeolitic material to a treatment with a liquid solvent system to decrease the molar ratio $X_2O_3:YO_2$ followed by a treatment with a liquid aqueous system having a pH in the range of 5.5 to 8 at elevated temperatures of at least 75° C. avoids that disadvantages.

Therefore, the present invention relates to a process for the post-treatment of a zeolitic material having an MWW framework structure, the process comprising (i) providing a zeolitic material having an MWW framework structure, wherein the framework structure of the zeolitic material comprises $X_2O_3$ and $YO_2$, wherein Y is a tetravalent element and X is a trivalent element and wherein the molar ratio $X_2O_3:YO_2$ is greater than 0.02:1;

(ii) treating the zeolitic material provided in (i) with a liquid solvent system thereby obtaining a zeolitic material having a molar ratio $X_2O_3:YO_2$ of at most 0.02:1, and at least partially separating the zeolitic material from the liquid solvent system;

(iii) treating the zeolitic material obtained from (ii) with a liquid aqueous system having a pH in the range of from 5.5 to 8 and a temperature of at least 75° C.;

wherein the pH of the aqueous system used in (iii) is determined using a pH sensitive glass electrode.

Step (i)

According to the present invention, $X_2O_3$ and $YO_2$ comprised in the MWW framework structure of the zeolitic material provided in (i) are contained therein as structure building elements, in contrast to non-framework elements which can be present in the pores and cavities formed by the framework structure.

Generally, there are no specific restrictions how the zeolitic material having an MWW framework structure is provided in (i). For example, it may be conceivable to purchase a suitable, commercially available zeolitic material having an MWW framework structure. Further, for example, any conceivable process for synthesizing such a zeolite can be employed for providing the zeolitic material. Preferably, the zeolitic material is provided in (i) by a process including hydrothermally synthesizing the zeolitic material starting from suitable sources of $X_2O_3$ and $YO_2$ in the presence of a suitable template compound, also referred to as structure directing agent.

Generally, the framework structure of the zeolitic material provided in (i) comprises $X_2O_3$ and $YO_2$. Preferably, the suitable sources of $X_2O_3$ and $YO_2$ are employed in an amount and subjected to hydrothermal synthesis conditions so that at least 75 weight-%, more preferably at least 90 weight-%, more preferably at least 95 weight-%, more preferably at least 98 weight-%, more preferably at least 99 weight-% of the framework structure of the zeolitic material provided in (i) consist of $X_2O_3$ and $YO_2$.

Generally, $X_2O_3$ and $YO_2$ may be comprised in the zeolitic material having an MWW framework structure with a molar ratio $X_2O_3:YO_2$ of greater than 0.02:1, preferably at least 0.03:1, more preferably in the range of from 0.03:1 to 0.07:1, more preferably from 0.03:1 to 0.06:1, more preferably from 0.03:1 to 0.05:1.

While there are no specific restrictions concerning the chemical nature of tetravalent elements Y, preferred tetravalent elements Y according to the present invention include, but are not restricted to, Si, Ti, Sn, Zr, Ge, and combinations of two or more thereof. More preferably, Y is selected from the group consisting of Si, Ti, Sn, Zr, Ge, and combinations of two or more thereof. More preferably, Y is selected from the group consisting of Si, Ti, Sn, Zr, and combinations of two or more thereof. More preferably, Y is Si.

While there are no specific restrictions concerning the chemical nature of trivalent elements X, preferred trivalent elements according to the present invention include, but are not restricted to, Al, B, In, Ga, Fe, and combinations thereof. More preferably, X is selected from the group consisting of Al, B, In, Ga, Fe, and combinations of two or more thereof. More preferably, X is selected from the group consisting of Al, B, In, and combinations of two or more thereof. More preferably, X is Al, B, or a combination thereof. More preferably, X is B.

Therefore, the present invention relates to the process above, wherein Y is selected from the group consisting of Si, Ti, Sn, Zr, Ge, and combinations of two or more thereof, Y preferably being Si, and wherein X is selected from the group consisting of Al, B, In, Ga, Fe and combinations of two or more thereof, X preferably being B.

Therefore, according to a preferred embodiment, a zeolitic material is provided in (i), having an MWW framework structure, wherein at least 90 weight-%, more preferably at least 95 weight-%, more preferably at least 98 weight-%, more preferably at least 99 weight-% of the framework structure consists of $B_2O_3$ and $SiO_2$, and wherein the molar ratio $B_2O_3:SiO_2$ is greater than 0.02:1, more preferably at least 0.03:1, more preferably in the range of from 0.03:1 to 0.07:1, more preferably from 0.03:1 to 0.06:1, more preferably from 0.03:1 to 0.05:1. This material is also referred to as B-MWW.

More preferably, the zeolitic material is provided in (i) by a process comprising
(a) hydrothermally synthesizing the zeolitic material from a synthesis mixture containing at least one silicon source, at least one boron source, and at least one template compound, preferably selected from the group consisting of piperidine, hexamethylene imine, N,N,N,N',N',N'-hexamethyl-1,5-pentanediammonium ion, 1,4-bis(N-methylpyrrolidinium)butane, octyltrimethylammonium hydroxide, heptyltrimethylammonium hydroxide, hexyltrimethylammonium hydroxide and a mixture thereof, to obtain the zeolitic material in its mother liquor;
(b) separating the zeolitic material from its mother liquor.

According to (a), suitable silicon sources include fumed silica or colloidal silica such as ammonia-stabilized colloidal silica, with ammonia-stabilized colloidal silica being especially preferred. Suitable boron sources include, for example, boric acid, borate salts, boron halides, $B_2O_3$, with boric acid being especially preferred.

Therefore, more preferably, the zeolitic material is provided in (i) by a process comprising
(a) hydrothermally synthesizing the zeolitic material from a synthesis mixture containing, ammonia stabilized colloidal silica as silicon source, boric acid as boron source, and at least one template compound selected from the group consisting of piperidine, hexamethylene imine, N,N,N,N',N',N'-hexamethyl-1,5-pentanediammonium ion, 1,4-bis(N-methylpyrrolidini-um)butane, octyltrimethylammonium hydroxide, heptyltrimethylammonium hydroxide, hexyltrimethylammonium hydroxide and a mixture thereof, to obtain the zeolitic material in its mother liquor;
(b) separating the zeolitic material from its mother liquor.

Further according to (a), a suitable starting mixture, preferably an aqueous mixture, is subjected to a hydrothermal synthesis under autogenous pressure, wherein the zeolitic material is crystallized during the hydrothermal synthesis. For crystallization purposes, it may be conceivable to use at least one suitable seeding material. Preferably, the crystallization time is in the range of from 3 to 8 days, more preferably from 4 to 6 days. During hydrothermal synthesis, the crystallization mixture may be stirred. The temperature applied during crystallization is preferably in the range of from 160 to 200° C., more preferably from 160 to 180° C. The amounts of precursor compounds are suitably chosen so that above-described B-MWW can be obtained having the described preferred compositions.

After hydrothermal synthesis, the obtained zeolitic material having an MWW framework structure is suitably separated from its mother liquor according to (b). All methods of separating the zeolitic material having an MWW framework structure from its mother liquor are conceivable. These methods include, for example, filtration, ultra-filtration, diafiltration and centrifugation methods or, for instance, spray drying processes and spray granulation processes. A combination of two or more of these methods can be applied. According to the present invention, the zeolitic material having an MWW framework structure is preferably separated from its mother liquid by filtration, and the thus obtained material, for example in the form of a filter cake, is preferably subjected to washing, preferably to washing with water, at a temperature in the range of from up to 50° C., preferably from 15 to 35° C., more preferably from 20 to 30° C. Subsequently, the filter cake, optionally further processed to obtained a suitable suspension, is subjected to spray-drying or to ultrafiltration. Prior to separating the zeolitic material having an MWW framework structure from its mother liquor, it is possible to increase the zeolitic material having an MWW framework structure content of the mother liquor by concentrating the suspension. If washing as applied, it is preferred to continue the washing process until the washing water has a conductivity of at most 1,000 microSiemens/cm, more preferably of at most 850 microSiemens/cm, more preferably of at most 700 microSiemens/cm.

After separation of the zeolitic material having an MWW framework structure from the suspension, preferably by filtration, and preferably after washing, the washed zeolitic material is optionally subjected to pre-drying, for example by subjecting to a suitable gas stream such as air, lean air, or technical nitrogen, for a time preferably in the range of from 4 to 10 h, more preferably from 5 to 8 h.

Then, the optionally pre-dried filter cake is preferably dried. Preferably, drying is carried out at a temperature in the range of from 100 to 300° C., more preferably from 150 to 275° C., more preferably from 200 to 250° C. in a suitable atmosphere such as technical nitrogen, air, or lean air. Such drying can be accomplished, for example, in a suitable drying oven, or by spray-drying. If the drying is accomplished by spray-drying, the drying gas inlet temperature is preferably in the range of from 200 to 250° C., more preferably from 220 to 250° C., and the drying gas outlet temperature is preferably in the range of from 100 to 175° C., more preferably from 120 to 150° C. If spray-drying is carried out, it is conceivable to subject the mother liquor containing the zeolitic material, optionally after concentration, directly to spray-drying. Further, it is conceivable to subject the separated and washed zeolitic material to spraydrying, optionally after suitable re-suspending of the washed and optionally pre-dried zeolitic material.

Therefore, the present invention also relates to the process above, wherein (b) comprises drying, preferably spray-drying of the zeolitic material, wherein during spraydrying, the drying gas inlet temperature is preferably in the range of from 200 to 250° C. and the drying gas outlet temperature is preferably in the range of from 100 to 175° C.

After the preferred drying, the zeolitic material having an MWW framework structure is optionally subjected to calcination. During calcination, the at least one template compound is preferably at least partially, more preferably essentially removed from the framework structure. Preferred calcination temperatures are the range of from 400 to 700° C., more preferably from 500 to 675° C., more preferably from 550 to 650° C. in a suitable atmosphere such as technical nitrogen, air, or lean air. Preferred calcination times are in the range of from 0.5 to 12 h, more preferably from 1 to 10 h, more preferably from 2 to 6 h.

Thus, according to a preferred embodiment of the present invention, prior to (ii), the zeolitic material provided in (i), optionally after spray-drying, is subjected to calcination, preferably at a temperature in the range of from 400 to 700° C., more preferably from 550 to 650° C., preferably for a period in the range of from 1 to 10 h, more preferably from 2 to 6 h.

The zeolitic material provided in (i) has a preferred water uptake which is determined according to the method as described in Reference Example 1 of the present invention in the range of from 11 to 25 weight-%, preferably from 16 to 20 weight-%. The crystallinity of the zeolitic material provided in (i), which crystallinity is determined according to the method as described in Reference Example 2 of the present invention, is preferably in the range of from 50 to 100%, preferably from 60 to 90%, more preferably from 70% to 85%.

Step (ii)

According to the present invention, the zeolitic material having an MWW framework structure, especially preferably the separated, spray-dried and calcined zeolitic material, provided in (i), is subjected to a treatment (ii) with a liquid solvent system wherefrom a zeolitic material having a molar ratio $X_2O_3:YO_2$ of at most 0.02:1 is obtained, and wherein the zeolitic material is at least partially separated from the liquid solvent system.

Generally, no specific restrictions exist concerning the chemical nature of the liquid solvent system used in (ii). Thus, it may be conceivable to use an acidic aqueous system for decreasing the molar ratio $X_2O_3:YO_2$ of the zeolitic material provided in (i) to a value of at most 0.02:1. As acids, the liquid solvent system may comprise, for example, hydrochloric acid, sulfuric acid, nitric acid, phosphoric acid, formic acid, acetic acid, propionic acid, oxalic acid, or tartaric acid. Preferably, the liquid solvent system used in (ii) is selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Most preferably, the liquid solvent system consists of water. Therefore, the present invention relates to above-defined process and zeolitic material obtainable or obtained therefrom, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water.

Further, it is especially preferred that the liquid solvent system does not contain an inorganic acid or an organic acid or a salt thereof, the acid being selected from the group consisting of hydrochloric acid, sulfuric acid, nitric acid, phosphoric acid, formic acid, acetic acid, propionic acid, oxalic acid, and tartaric acid. Therefore, the present invention also relates to the process above, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, and wherein the liquid solvent system does not contain an inorganic or organic acid, or a salt thereof, the acid being selected from the group consisting of hydrochloric acid, sulfuric acid, nitric acid, phosphoric acid, formic acid, acetic acid, propionic acid, oxalic acid, and tartaric acid. Even more preferably, the present invention also relates to the process above, wherein the liquid solvent system is selected from the group consisting of water, methanol, ethanol, propanol, ethane-1,2-diol, propane-1,2-diol, propane-1,3-diol, propane-1,2,3-triol, and mixtures of two or more thereof, preferably water, and wherein the liquid solvent system does not contain an inorganic or organic acid, or a salt thereof.

The reaction conditions according to (ii) are not specifically restricted, provided that the solvent system described above is in its liquid state and that the molar ratio $X_2O_3:YO_2$ is decreased to a value of at most 0.02:1. In particular, concerning the preferred temperatures described below, the skilled person will choose the respective pressure under which the treating is carried out in order to keep the solvent system in its liquid state.

Concerning the duration of the treating according to (ii), no specific restrictions exist. The above mentioned time is to be understood as the time where the liquid solvent system is maintained under the below described treating temperature. Preferably, in (ii), the treating is carried out for a period of from 6 to 20 h, preferably from 7 to 17 h, more preferably from 8 to 12 h. The preferred treating temperatures are in the range of from 50 to 125° C., preferably from 90 to 115° C., more preferably from 95 to 105° C. Most preferably, the treating according to (ii) is carried out at the boiling point of the solvent system. If the solvent system is comprised of two or more components, the treating according to (ii) is preferably carried out at the boiling point of the component having the lowest boiling point.

According to a preferred embodiment of the present invention, the treating according to (ii) is carried out under reflux. Thus, the preferred vessel, representing an open system, used for the treating according to (ii) is preferably equipped with a reflux condenser. During (ii), the temperature of the liquid solvent system is kept essentially constant or changed, the treating with the liquid solvent system thus being carried out at two or more different temperatures.

Most preferably, the temperature is kept essentially constant within the above-defined ranges.

Therefore, the present invention relates to the process above, comprising (ii) treating the zeolitic material provided in (i) with a liquid solvent system, preferably water, thereby obtaining a zeolitic material having a molar ratio $X_2O_3$:$YO_2$, preferably $B_2O_3$:$SiO_2$, of at most 0.02:1 in an open system under reflux at a temperature in the range of from 95 to 105° C., and at least partially separating the zeolitic material from the liquid solvent system.

As far as the amount of zeolitic material which is employed relative to the amount of liquid solvent system, no specific restrictions exist. Preferably, the weight ratio of zeolitic material relative to the liquid solvent system is in the range of from 1:5 to 1:50, more preferably from 1:10 to 1:35, more preferably from 1:10 to 1:20, even more preferably from 1:12 to 1:18.

During treating according to (ii), it is further preferred to suitably stir the liquid solvent system. During (ii), the stirring rate is kept essentially constant or changed, the treating with the liquid solvent system according to (ii) thus being carried out at two or more different stirring rates. Most preferably, the zeolitic material having an MWW framework structure is suspended in the liquid solvent system at a first stirring rate, and during the treating at above-described temperatures, the stirring rate is changed, preferably increased. The stirring rates as such can be suitably chosen depending, for example, on the volume of the liquid solvent system, the amount of the zeolitic material employed, the desired temperature, and the like. Preferably, the stirring rate under which the treating of the zeolitic material having an MWW framework structure at the above-described temperatures is carried out is preferably in the range of from 50 to 300 r.p.m. (rounds per minute), more preferably from 150 to 270 r.p.m., more preferably from 240 to 260 r.p.m.

According to a conceivable embodiment of the present invention, the treating according to (ii) may be carried out in two or more steps wherein between at least two steps, the zeolitic material obtained from a given treating according to (ii) is subjected to drying, preferably at a temperature in the range of from 90 to 200° C., more preferably from 100 to 150° C., and the thus dried material is subjected to a further treating according to (ii). As to the individual treating steps according to (ii) and the conditions applied, full reference is made to the conditions as described above. Concerning the treating time, the sum of the treating times of the individual steps are to be understood as the treating time described above. For each of the at least 2 individual treating steps, the same or different treating conditions can be applied. Therefore, the present invention relates to above-defined process and zeolitic material obtainable or obtained therefrom, wherein the treating according to (ii) is carried out in at least 2 separate steps, wherein between at least 2 treating steps, the zeolitic material is dried, preferably at a temperature in the range of from 100 to 150° C. Suitable drying atmospheres include technical nitrogen, air, or lean air.

After the treating according to (ii), the obtained zeolitic material having an MWW framework structure is suitably separated from the suspension. All methods of separating the zeolitic material having an MWW framework structure from the respective suspension are conceivable. These methods include filtration, ultrafiltration, diafiltration and centrifugation methods or, for instance, spray-drying processes and spray granulation processes. A combination of two or more of these methods can be applied. According to the present invention, the zeolitic material having an MWW framework structure is preferably separated from the suspension by filtration. Preferably, a filter cake is obtained which is preferably subjected to washing, preferably with water. If washing is applied, it may be preferred to continue the washing process until the washing water has a conductivity of at most 1,000 microSiemens/cm, more preferably of at most 850 microSiemens/cm, more preferably of at most 700 microSiemens/cm In general, the process of the present invention can optionally comprise further steps for the work-up and/or further physical and/or chemical transformation of the zeolitic material having an MWW framework structure obtained in (ii). The obtained zeolitic material can for example be subject to any sequence of isolation and/or washing procedures, wherein the zeolitic material is preferably subject to at least one isolation and at least one washing procedure.

After separation of the zeolitic material having an MWW framework structure from the suspension, preferably achieved via filtration, and after washing, the washed filter cake containing the zeolitic material having an MWW framework structure is optionally subjected to drying, for example by subjecting the filter cake to a suitable gas stream such as air, lean air, or nitrogen, preferably a nitrogen stream. Thus, according to a particular preferred embodiment of the present invention prior to (iii), the zeolitic material is subjected to drying. Concerning the duration and the temperature of drying no specific restrictions exist. Preferably, drying is carried out at a temperature in the range of from 100 to 180° C., preferably from 120 to 150° C., for a period in the range of from 10 to 70 h, preferably from 15 to 25 h. If spray-drying is carried out, it is conceivable to subject the liquid solvent system containing the zeolitic material, optionally after concentration, directly to spray-drying. Further, it is conceivable to subject the separated and washed zeolitic material to spray-drying, optionally after suitable resuspending of the washed and optionally pre-dried zeolitic material.

After separation of the zeolitic material from the suspension, preferably by filtration, and preferably after washing, and prior to drying, the washed zeolitic material can be subjected to pre-drying, for example by subjecting to a suitable gas stream such as air, lean air or nitrogen, preferably a nitrogen stream, for a time preferably in the range of from 4 to 10 h, more preferably from 5 to 8 h.

According to (ii), the preferably dried zeolitic material is optionally subjected to calcination. Preferably, the calcination is carried out in a suitable atmosphere such as air, lean air, or nitrogen at a temperature in the range of from 400 to 700° C., preferably from 550 to 650° C., for a period in the range of from 1 to 10 h, preferably from 2 to 6 h.

According to the present invention, the treatment according to (ii) with the liquid solvent system reduces the molar ratio $X_2O_3$:$YO_2$ of the zeolitic material framework; thus, it is a procedure for at least partially removing X from the MWW framework structure. Therefore, the molar ratio $X_2O_3$:$YO_2$ of the zeolitic material having an MWW framework structure obtained from (ii) is higher than the molar ratio $X_2O_3$:$YO_2$ of the zeolitic material having an MWW framework structure provided in (i). According to a preferred embodiment of the present invention, the molar ratio $X_2O_3$:$YO_2$ obtained in (ii) is at most 0.02:1, preferably in the range of from 0.001:1 to 0.01:1, more preferably from 0.001:1 to 0.005:1, more preferably from 0.001:1 to 0.003:1. Therefore, according to an especially preferred embodiment of the invention, a zeolitic material having an MWW framework structure is obtained from (ii) which has a molar ratio $B_2O_3$:$SiO_2$ of at most 0.02:1, preferably at most 0.01:1, more preferably in the range of from 0.001:1 to 0.01:1, more preferably from 0.001:1 to 0.005:1, more preferably from 0.001:1 to 0.003:1.

According to an especially preferred embodiment of the present invention, the zeolitic material obtained from (ii) is in the form of a powder, preferably in the form of a spray powder wherein the spray-powder mas result either from spray-drying in (i) and/or spray-drying in (ii), as described above. Preferably, spray-drying is carried out in (i), and no spray-drying is carried out in (ii).

Step (iii)

After (ii), the zeolitic material having an MWW framework structure, preferably the separated and dried zeolitic material having an MWW framework structure is subjected to a treatment with a liquid aqueous system having a pH in the range of 5.5 to 8 and a temperature of at least 75° C.

According to the present invention, any conceivable amount of water can be contained in the liquid aqueous system, provided that the water content of the liquid aqueous sytem is greater than 50 weight-% and the pH of the liquid aqueous system is in the above-mentioned range. Generally, the amount of water contained in the liquid aqueous system is at least 85 weight-%, preferably at least 90 weight-%, more preferably at least 95 weight-%, more preferably, at least 99 weight-%, even more preferably at least 99.9 weight-%. Even more preferably, the liquid aqueous system used in (iii) essentially consists of water, and may only contain certain impurities which are contained in the water, preferably contained in the preferably used deionized water. Thus, according to a preferred embodiment of the present invention, in (iii), the liquid aqueous system comprises at least 90 weight-%, preferably at least 99 weight-%, more preferably at least 99.9 weight-% water.

Concerning the pH of the aqueous system used in (iii), a pH in the range of from 5.5 to 8 is preferred. The pH of the liquid aqueous system is determined using a pH sensitive glass electrode. According to a further preferred embodiment of the present invention, the liquid aqueous system used in (iii) has a pH in the range of from 6 to 7.5, preferably from 6.5 to 7.5.

Concerning the duration of the treatment with the liquid aqueous system according to (iii), no particular restrictions exist. Preferably, in (iii), the zeolitic material is treated with the liquid aqueous system for a period in the range of from 0.5 h to 24 h, preferably from 1 h to 18 h, more preferably from 8 h to 14 h.

Further, no particular restrictions exist concerning the temperature of the liquid aqueous system, provided that the aqueous system is in its liquid state. Therefore, concerning the preferred temperatures described below, the skilled person will choose the respective pressure under which the treating according to (ii) is carried out in order to keep the solvent system in its liquid state.

Preferably, in (iii), the zeolitic material is treated with the liquid aqueous system at a temperature in the range of from 75 to 200° C., preferably from 90 to 180° C., more preferably from 100 to 160° C., more preferably from 110 to 160° C., more preferably from 110 to 150° C.

While concerning the type of vessel in which heating in (iii) is conducted, no particular restrictions exist, the vessel is suitably selected to allow to treat the zeolitic material at the temperatures described above, at which temperatures the aqueous system is in its liquid state. Therefore, as far as higher temperatures are concerned, the treatment according to (iii) is carried out in a closed system under autogenous pressure.

According to a conceivable embodiment of the present invention, heating in (iii) is conducted in an open system. In this case, the reaction conditions are restricted by the temperature as the treating is carried out below the boiling temperature of the employed aqueous system in order to keep the aqueous system in its liquid state.

According to a preferred embodiment, heating in (iii) is conducted in a closed system. Thus, heating in (iii) is preferably conducted under solvothermal conditions, meaning that the zeolitic material is treated with the liquid aqueous system under autogenous pressure of the liquid aqueous system, for example in an autoclave or other vessels suited for generating solvothermal conditions.

Therefore, according to a particular preferred embodiment of the present invention, in (iii), the zeolitic material is treated with the liquid aqueous system in a closed system, preferably an autoclave, under autogenous pressure.

Consequently, according to a preferred embodiment of the present invention, treating according to (ii) is carried out in an open system, preferably under reflux, and treating according to (iii) is carried out in a closed system, preferably under autogeneous pressure wherein in (ii), the solvent system is in its liquid state and in (iii), the aqueous system is in its liquid state.

Therefore, the present invention also relates to the process as defined above, comprising (ii) treating the zeolitic material provided in (i) with a liquid solvent system, preferably water, thereby obtaining a zeolitic material having a molar ratio $X_2O_3$:$YO_2$, preferably $B_2O_3$:$SiO_2$, of at most 0.02:1, in an open system under reflux at a temperature in the range of from 95 to 105° C., and at least partially separating the zeolitic material from the liquid solvent system;

(iii) treating the zeolitic material obtained from (ii) with a liquid aqueous system, preferably water, having a pH in the range of 6.5 to 7.5 and a temperature in the range of from 110 to 160° C. in a closed system under autogenous pressure.

During treating according to (iii), it is further preferred to suitably stir the liquid aqueous system. During (iii), the stirring rate is kept essentially constant or changed, the treating thus being carried out at two or more different stirring rates. Most preferably, the zeolitic material is suspended in the liquid aqueous system at a first stirring rate, and during (iii) at above-described temperatures, the stirring rate is changed, preferably increased. The stirring rates as such can be suitably chosen depending, for example, on the volume of the liquid solvent system, the amount of the zeolitic material employed, the desired temperature, and the like. Preferably, the stirring rate under which the treating at the above-described temperatures is carried out is preferably in the range of from 50 to 300 r.p.m., more preferably from 120 to 250 r.p.m., more preferably from 190 to 210 r.p.m.

As far as the amount of the liquid aqueous system used in (iii) is concerned relative to the amount of the zeolitic material which is employed, no specific restrictions exist. Preferably, in (iii), the weight ratio of the liquid aqueous system relative to the zeolitic material is in the range of from 35:1 to 5:1, preferably from 30:1 to 10:1, more preferably from 25:1 to 15:1.

After the treatment according to (iii), the zeolitic material having an MWW framework structure is preferably separated from the suspension. Separation of the zeolitic material can be achieved by any conceivable method including, for example, filtration, ultra-filtration, diafiltration and centrifugation and/or decantation methods, wherein filtration methods can involve suction and/or pressure filtration steps.

Subsequently, the separated zeolitic material is subjected to one ore more optional washing procedures. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent. If washing as applied, it may be preferred to continue the washing process until the washing water has a conductivity of at most 1,000 microSiemens/cm, more preferably of at most 850 microSiemens/cm, more preferably of at most 700 microSiemens/cm.

In general, the process of the present invention can optionally comprise further steps for the work-up and/or further physical and/or chemical transformation of the zeolitic material having an MWW framework structure obtained in (iii). The obtained zeolitic material can for example be subject to any sequence of isolation and/or washing procedures, wherein the zeolitic material obtained from (iii) is preferably subject to at least one isolation and at least one washing procedure.

After separation of the zeolitic material having an MWW framework structure from the suspension, preferably achieved via filtration, and after washing, the washed filter cake containing the zeolitic material having an MWW framework structure is optionally subjected to drying, for example by subjecting the filter cake to a suitable gas stream, preferably a nitrogen stream. Thus, according to a particular preferred embodiment of the present invention in (iii), the zeolitic material is subjected to drying. Concerning the duration and the temperature of drying no specific restrictions exist. Preferably, drying is carried out in a suitable atmosphere such as air, lean air, or nitrogen, at a temperature in the range of from 100 to 180° C., preferably from 120 to 150° C., for a period in the range of from 5 to 70 h, preferably from 10 to 20 h.

After separation of the zeolitic material from the suspension, preferably by filtration, and preferably after washing, and prior to drying, the washed zeolitic material can be subjected to pre-drying, for example by subjecting to a suitable gas stream such as air, lean air, or nitrogen, for a time preferably in the range of from 4 to 10 h, more preferably from 5 to 8 h.

Further, according to a preferred embodiment of the invention, the zeolitic material, optionally after drying, is subjected to calcination in (iii). Preferably, calcination is carried out at a temperature in the range of from 350 to 600° C., preferably from 400 to 500° C., for a period in the range of from 1 to 10 h, preferably from 2 to 6 h. Suitable calcination atmospheres include nitrogen, air, or lean air.

Surprisingly, it was found that by the process according to the present invention, a zeolitic material with a decreased molar ratio $X_2O_3:YO_2$ relative to the zeolitic material provided in (i) could be obtained wherein, at the same time, the crystallinity of the zeolitic material provided in (i) could be kept constant or even increased. In particular, it was found that by the process according to the present invention, a B-MWW zeolitic material with a decreased molar ratio $B_2O_3:SiO_2$ relative to the zeolitic material provided in (i) could be obtained wherein, at the same time, the crystallinity of the zeolitic material provided in (i) could be kept constant or even increased. Therefore, the combination of the deboronation step according to (ii) and the subsequent treatment with the liquid aqueous system was found to overcome the disadvantages of the prior art processes.

Yet further, it was found that using the inventive process, the hydrophobicity of the zeolitic material, characterized by water uptake measurements as described herein, can be kept constant or even be increased. Such an increase in the hydrophobicity is desired for many potential uses of the zeolitic material such catalytically active materials.

Thus, according to a preferred embodiment of the present invention, the crystallinity of the zeolitic material obtained from (iii) is equal to or higher than the crystallinity of the zeolitic material provided in (i), and the water uptake of the zeolitic material obtained from (iii) is lower than the water uptake of the zeolitic material provided in (i).

By way of example, the crystallinity of the zeolitic material obtained from (iii), as determined via XRD analysis, is at least 1%, preferably at least 2%, more preferably at least 3%, more preferably at least 4%, more preferably at least 5%, more preferably at least 6%, more preferably at least 7.5% higher than the crystallinity of the zeolitic material provided in (i). Further by way of example, the water uptake of the zeolitic material obtained from (iii) is at least 5%, preferably at least 10%, more preferably at least 15%, more preferably at least 18% lower than the water uptake of the zeolitic material provided in (i).

Especially preferably, the process of the present invention does not comprise a steam treatment, in particular a water steam treatment, neither prior to, nor during, nor after (iii). Thus, preferably, the zeolitic material obtained from the inventive process is not subjected to a steam treatment during the entire process.

Further preferably, the process of the present invention does not comprise a treatment of the zeolitic material with an aqueous solution having a pH below 5.5 or above 8, neither prior to, nor during, nor after (iii). Thus, preferably, the zeolitic material obtained from the inventive process is not subjected to an acid treatment or a base treatment during the entire process.

The present invention further relates to a zeolitic material which is obtainable or obtained by the process according to the present invention.

Preferred Zeolitic Materials

As mentioned above, the process according to the present invention exhibits major advantages regarding the crystallinity and also the hydrophobicity of the zeolitic materials, which materials are preferably a powder or a spray powder, having a lower molar ratio $X_2O_3:YO_2$ relative to the starting zeolitic material. As defined above, Y is preferably selected from the group consisting of Si, Ti, Sn, Zr, Ge, and combinations of two or more thereof, Y preferably being Si, and X is preferably selected from the group consisting of Al, B, In, Ga, Fe and combinations of two or more thereof, X preferably being B.

Therefore, the present invention also relates to zeolitic materials having an MWW framework structure, wherein the framework structure comprises $YO_2$ and $X_2O_3$, wherein Y is a tetravalent element and X is a trivalent element, said zeolitic material having a molar ratio $X_2O_3:YO_2$ of at most 0.02:1, a crystallinity, as determined by XRD analysis, of at least 75% and a water uptake of at most 11 weight-%, wherein preferably at least 95 weight-%, more preferably at least 98 weight-%, more preferably at least 99 weight-% of the framework structure of the zeolitic materials consist of $X_2O_3$ and $YO_2$. In particular, the present invention relates to zeolitic materials having an MWW framework structure, wherein the framework structure comprises $B_2O_3$ and $SiO_2$, said zeolitic materials having a molar ratio $B_2O_3:SiO_2$ of at most 0.02:1, a crystallinity, as determined by XRD analysis, of at least 75% and a water uptake of at most 11 weight-%, and wherein preferably at least 95 weight-%, more preferably at least 98 weight-%, more preferably at least 99 weight-% of the framework structure of the zeolitic material consist of $B_2O_3$ and $SiO_2$.

Preferably, the molar ratio $X_2O_3:YO_2$, preferably the molar ratio $B_2O_3:SiO_2$, is at most 0.01:1, preferably in the range of from 0.001:1 to 0.01:1, more preferably from 0.001:1 to 0.003:1, the crystallinity of the zeolitic material is in the range of from 75 to 90%, preferably from 75 to 85%, and the water uptake of the zeolitic material is in the range of from 4 to 11 weight-%, preferably from 6 to 10 weight-%.

Still further, it was found that the inventive zeolitic materials are characterized by an infrared spectrum which exhibits a first type of silanol groups which are represented by a first absorption band with a maximum in the region of from 3710 to 3750 cm$^{-1}$, and a second type of silanol groups which are represented by a second absorption band with a maximum in the region of from 3480 to 3540 cm$^{-1}$. Preferably, the intensity of said first absorption band relative to the intensity of said second absorption band is at least 1.0. Therefore, the present invention also relates to above-defined zeolitic material, wherein the IR spectrum of the zeolitic material exhibits a first absorption band with a maximum in the range of from 3710 to 3750 cm$^{-1}$ and a second absorption band with a maximum in the range of from 3480 to 3540 cm$^{-1}$, wherein the ratio of the intensity of the first absorption band relative to the intensity of the second absorption band is at least 1.0. Preferably, said ratio is at least 1.3. As to the IR measurements as described in the present invention, reference is made to Reference Example 4 of the present invention.

Yet further, it was found that the inventive zeolitic materials are characterized by an $^{29}$Si-NMR spectrum which comprises a first peak at −99.0 ppm +/−3.0 ppm, preferably +/−2.5 ppm,
a second peak at −104.9 ppm +/−0.9 ppm, preferably +/−0.5 ppm,
a third peak at −110.7 ppm +/−0.7 ppm, preferably +/−0.4 ppm,
a fourth peak at −112.5 ppm +/−1.5 ppm, preferably +/−1.0 ppm,
a fifth peak at −115.1 ppm +/−0.7 ppm, preferably +/−0.4 ppm,
a sixth peak at −118.9 ppm +/−0.7 ppm, preferably +/−0.4 ppm, wherein the integral of the sixth peak is at least 5%, preferably at least 7%, more preferably at least 9% of the total integral. As to the 29Si-NMR measurements as described in the present invention, reference is made to Reference Example 3 of the present invention.

Preferred Uses

The zeolitic material having an MWW framework structure according to the invention, preferably obtainable or obtained by the process according to the invention, is preferably used as catalyst, as catalyst support, or as catalyst component. By way of example, the use as a noble metal catalyst support in diesel oxidation catalysts (DOC) or the use as washcoat component in a DOC may be mentioned. Yet further, the zeolitic material can be used as starting material for the preparation of a zeolitic catalyst for the epoxidation of olefins such as propene wherein based on the zeolitic material of the present invention, a zeolitic material comprising at least one heteroatom, preferably Ti and/or Zn, preferably Ti and Zn is suitably prepared, and wherein the at least one heteroatom is either contained in the framework structure of the zeolitic material and/or present as extra-framework structure element.

Therefore, the present invention also relates to a catalytic process, wherein a zeolitic material according to the present invention or obtainable or obtained according to the process of the present invention is employed as a catalyst, or as a catalyst component. Further, the present invention also relates to a process for the preparation of a zeolite catalyst, wherein the zeolitic material according to the present invention or obtainable or obtained according to the process of the present invention is used as catalyst precursor.

Generally, and in particular in case the inventive zeolitic material is used as catalyst, it is possible to prepare a molding comprising the zeolitic material, for example by suitably mixing the zeolitic material with at least one binder and/or with at least one binder precursor, and optionally at least one pore-forming agent and/or at least one plasticizing agent. The moldings may be shaped in every conceivable geometry such as strands, for example having rectangular, triangular hexagonal, quadratic, oval, or circular cross-section, stars, tablets, spheres, hollow cylinders, and the like. Examples of such binders are metal oxides, such as, for example, $SiO_2$, $Al_2O_3$, $TiO_2$, $ZrO_2$ or MgO or clays or mixtures of two or more of these oxides or mixed oxides of at least two of Si, Al, Ti, Zr, and Mg. Pore-forming agent such as mesopore-forming agents inlcude polymeric vinyl compounds, such as polyalkylene oxides like polyethylene oxides, polystyrene, polyacrylates, polymethacrylates, polyolefins, polyamides and polyesters. Pasting agents include organic, in particular hydrophilic polymers, such as carbohydrates like cellulose, cellulose derivatives, such as methyl cellulose, and starch, such as potato starch, wallpaper plaster, polyacrylates, polymethacrylates, polyvinyl alcohol, polyvinylpyrrolidone, polyisobutene or polytetrahydrofuran. The use of water, alcohols or glycols or mixtures thereof, such as mixtures of water and alcohol, or water and glycol, such as for example water and methanol, or water and ethanol, or water and propanol, or water and propylenglycol, as pasting agents may be mentioned.

The present invention is illustrated by the following examples.

EXAMPLES

Reference Example 1

Determination of the Water Uptake

Water adsorption/desorption isotherms were performed on a VTI SA instrument from TA Instruments following a step-isotherm program. The experiment consisted of a run or a series of runs performed on a sample material that has been placed on the microbalance pan inside of the instrument. Before the measurement was started, the residual moisture of the sample was removed by heating the sample to 100° C. (heat-ing ramp of 5° C./min) and holding it for 6 h under a nitrogen flow. After the drying program, the temperature in the cell was decreased to 25° C. and kept constant during the measurement. The microbalance was calibrated, and the weight of the dried sample was balanced (maximum mass deviation 0.01 weight-%). Water uptake of a sample was measured as the increase in weight compared to the dry sample. First, an adsorption curve was measured by increasing the relative humidity (RH) (expressed as weight-% water in the atmosphere inside of the cell) to which the sample was exposed and measuring the water uptake by the sample as equilibrium. The RH was increased with a step of 10% from 5% to 85% and at each step the system controlled the RH and monitored the weight of the sample until reaching the equilibrium conditions after the sample and recording the weight uptake. The total adsorbed water of the sample was taken after the sample was exposed to the 85 weight-% RH. During the desorption measurement, the RH was decreased from 85 weight-% to 5 weight-% with a step of 10% and the change in the weight of the sample (water uptake) was monitored and recorded.

Reference Example 2

Determination of the Crystallinity

The crystallinity of the zeolitic materials according to the present invention was determined by XRD analysis, wherein the crystallinity of a given material is expressed relative to a reference zeolitic material wherein the reflecting surfaces of the two zeolitic materials are compared. The reference zeolitic material was zeolite ammonium beta powder commercially available under the CAS registry number 1318-02-1. The determinations of the crystallinities were performed on a D8 Advance series 2 diffractometer from Bruker AXS. The diffractometer was configured with an opening of the divergence aperture of 0.1° and a Lynxeye detector. The samples as well as the reference zeolitic material were measured in the range from 19° to 25° (2 Theta). After baseline correction, the reflecting surfaces were determined by making use of the evaluation software EVA (from Bruker AXS). The ratios of the reflecting surfaces are given as percentage values.

Reference Example 3

$^{29}$Si-NMR Measurements

All $^{29}$Si solid-state NMR experiments were performed using a Bruker Avance spectrometer with 300 MHz $^1$H Larmor frequency (Bruker Biospin, Germany). Samples were packed in 7 mm $ZrO_2$ rotors, and measured less than 5 kHz Magic Angle Spinning at room temperature. $^{29}$Si direct polarization spectra were obtained using (pi/2)-pulse excitation with 5 microseconds pulse with a $^{29}$Si carrier frequency corresponding to −65 ppm in the spectrum, and a scan recycle delay of 120 s. Signal was acquired for 25 ms under 45 kHz high-power proton decoupling, and accumulated over 10 to 17 h. Spectra were processed using Bruker Topspin with 30 Hz exponential line broadening manual phasing and manual baseline correction over the entire spectrum. Spectra were referenced with the polymer Q8M8 as an external secondary standard, setting the resonance of the trimethylsilyl group to 12.5 ppm. The spectra were then fitted with a set of Gaussian line shapes, according to the number of discernable resonances. Fitting was performed using DMFit (Massiot et al., Magnetic Resonance in Chemistry, 40 (2002), pp 70-76). Peaks were manually set at the visible peak maxima or shoulder. Both peak position and line width were then left unrestrained, i.e., fit peaks were not fixed at a certain position. The fitting result was numerically stable, i.e., distortions in the initial fit setup as described above led to similar results. The fitted peak areas were further used normalized as performed by DMFit.

Reference Example 4

IR Measurements

The IR measurements were performed on a Nicolet 6700 spectrometer. The zeolitic materials were pressed into a self-supporting pellet without the use of any additives. The pellet was introduced into a high vacuum cell placed into the IR instrument. Prior to the measurement the sample was pretreated in high vacuum ($10^{-5}$ mbar) for 3 h at 300° C. The spectra were collected after cooling the cell to 50° C. The spectra were recorded in the range of 4000 $cm^{-1}$ to 800 $cm^{-1}$ at a resolution of 2 $cm^{-1}$. The obtained spectra were represented by a plot having on the x axis the wavenumber ($cm^{-1}$) and on the y axis the absorbance (arbitrary units). For the quantitative determination of the peak heights and the ratio between the peaks a baseline correction was carried out. Changes in the 3000 to 3900 $cm^{-1}$ region were analyzed and for comparing multiple samples, the band at 1800±5 $cm^{-1}$ was taken as reference.

Example 1

Process According to the Invention (i) Providing a Starting Material (Zeolitic Material of Framework Structure MWW)

480 kg de-ionized water were provided in a vessel. Under stirring at 70 rpm (rounds per minute), 166 kg boric acid were suspended in the water at room temperature. The suspension was stirred for another 3 h at room temperature. Subsequently, 278 kg piperidine were added, and the mixture was stirred for another hour. To the resulting solution, 400 kg Ludox® AS-40 were added, and the resulting mixture was stirred at 70 rpm for another hour at room temperature. The finally obtained mixture was transferred to a crystallization vessel and heated to 170° C. within 5 h under autogenous pressure and under stirring (50 rpm). The temperature of 170° C. was kept essentially constant for 120 h. During these 120 h, the mixture was stirred at 50 rpm. Subsequently, the mixture was cooled to a temperature of from 50-60° C. The aqueous suspension containing B-MWW had a pH of 11.3 as determined via measurement with a pH-sensitive electrode. From said suspension, the B-MWW was separated by filtration. The filter cake was then washed with de-ionized water at room temperature until the washing water had a conductivity of less than 700 microSiemens/cm. The thus obtained filter cake was admixed with water to obtain a suspension having a solid content of 15 weight-%. This suspension was subjected to spray-drying in a spray-tower with the following spray-drying conditions:
  drying gas, nozzle gas: technical nitrogen
  temperature drying gas:
    temperature spray tower (in): 235° C.
    temperature spray tower (out): 140° C.
  nozzle:
    top-component nozzle supplier Gerig; size 0
    nozzle gas temperature: room temperature
    nozzle gas pressure: 1 bar
  operation mode: nitrogen straight
  apparatus used: spray tower with one nozzle
  configuration: spray tower-filter-scrubber
  gas flow: 1,500 kg/h
  filter material: Nomex® needle-felt 20 m²
  dosage via flexible tube pump: SP VF 15 (supplier: Verder)

The spray tower was comprised of a vertically arranged cylinder having a length of 2,650 mm, a diameter of 1,200 mm, which cylinder was conically narrowed at the bottom. The length of the conus was 600 mm. At the head of the cylinder, the atomizing means (a two-component nozzle) were arranged. The spray-dried material was separated from the drying gas in a filter downstream of the spray tower, and the drying gas was then passed through a scrubber. The suspension was passed through the inner opening of the nozzle, and the nozzle gas was passed through the ring-shaped slit encircling the opening.

The spray-dried material was then subjected to calcination at 600° C. for 10 h. The calcined material had a molar ratio $B_2O_3$:$SiO_2$ molar ratio of 0.06 and a crystallinity of 74%, determined according to Reference Example 2.

(ii) Treatment with a Liquid Solvent System—Deboronation 9 kg of de-ionized water and 600 g of the spray-dried material obtained according to Example 1 (i) were refluxed at 100° C. under stirring at 250 r.p.m. for 10 h. The resulting deboronated zeolitic material was separated from the suspension by filtration and washed with 8 l deionized water at room temperature. After the filtration, the filter cake was dried at a temperature of 120° C. for 16 h.

The dried zeolitic material having an MWW framework structure had a $B_2O_3$:$SiO_2$ molar ratio of 0.0022, a water uptake of 12%, determined according to Reference Example 1, and a crystallinity of 77%, determined according to Reference Example 2.

(iii) Treatment with a Liquid Aqueous System 2 kg de-ionized water were provided in a vessel and 100 g of the deboronated zeolitic material obtained according to Example 1 (ii) having a crystallinity of 77% and a water uptake of 12 weight-% were added under stirring. The suspension was stirred for 10 min at room temperature. Thereafter, the suspension was heated at 140° C. under autogenous pressure for 12 h in an autoclave. The resulting zeolitic material was separated from the suspension by filtration and washed with deionized water. After the filtration, the filter cake was dried at a temperature of 120° C. for 16 h.

The dried zeolitic material was then subjected to calcination. The zeolitic material was heated to 450° C. within 5.5 h and heated at this temperature for 2 h. The calcined material had a $B_2O_3$:$SiO_2$ molar ratio of 0.0015, a crystallinity of 83% and a water uptake of 8.9 weight-%.

Results of Example 1

According to the present invention, a combination of a deboronation procedure using a liquid solvent system (water) with a treatment with a liquid aqueous system (water) was carried out. This combination, on the one hand, led to a zeolitic material having an MWW framework structure with a molar ratio $B_2O_3$:$SiO_2$ which decreases from of 0.06:1 to 0.0015:1, and on the other hand, allowed to increase the crystallinity from 74% (or 77% after deboronation) to 83%.

Moreover, the water uptake of the zeolitic material which characterizes the hydrophobicity of the zeolitic material and, thus, an important chemical parameter of the zeolitic material, did not change significantly (12 weight-% for starting material, 8.9 weight-% of the product).

Example 2

Process According to the Invention (iii) Treatment with a Liquid Aqueous System 1600 g de-ionized water were provided in a vessel and 80 g of the deboronated zeolitic material obtained according to Example 1 (ii) having a $B_2O_3$:$SiO_2$ molar ratio of 0.002, crystallinity of 77% and a water uptake of 12 weight-% were added under stirring. The suspension was stirred for 10 min. Thereafter, the suspension was heated at 140° C. under autogenous pressure for 12 h in an autoclave.

The resulting zeolitic material was separated from the suspension by filtration and washed with deionized water. After the filtration, the filter cake was dried at a temperature of 120° C. for 10 h.

The dried zeolitic material was then subjected to calcination. For calcination, the zeolitic material was heated to 450° C. within 5.5 h and kept at this temperature for 2 h. The calcined material had a $B_2O_3$:$SiO_2$ molar ratio of 0.0023:1, a crystallinity of 87% and a water uptake of 9.3 weight-%.

Results of Example 2

As Example 1, also Example 2 shows that the inventive process leads to a zeolitic material having an MWW framework structure with a molar ratio $B_2O_3$:$SiO_2$ which decreases from of 0.06:1 to 0.0021:1, and simultaneously allows to increase the crystallinity from 74% (or 77% after deboronation) to 87%.

Moreover, the water uptake of the zeolitic material which characterizes the hydrophobicity of the zeolitic material and, thus, an important chemical parameter of the zeolitic material, did not change significantly (12 weight-% for starting material, 9.3 weight-% of the product).

Example 3

Process According to the Invention (iii) Treatment with a Liquid Aqueous System 1600 g de-ionized water were provided in a vessel and 80 g of the deboronated zeolitic material obtained according to Example 2 (ii) having a $B_2O_3$:$SiO_2$ molar ratio of 0.002, crystallinity of 77% and a water uptake of 12 weight-% were added under stirring (200 rpm). The suspension was stirred for 10 min. Thereafter, the suspension was heated at 140° C. under autogenous pressure for 14 h in an autoclave.

The resulting zeolitic material was separated from the suspension by filtration and washed with deionized water. After the filtration, the filter cake was dried at a temperature of 120° C. for 10 h.

The dried zeolitic material was then subjected to calcination. The zeolitic material was heated to 450° C. within 5.5 h and heated at this temperature for 2 h. The calcined material had a $B_2O_3$:$SiO_2$ molar ratio of 0.0008 a crystallinity of 85% and a water uptake of 10.7 weight-%.

Results of Example 3

As Examples 1 and 2, also Example 3, carried out for 14 h under autogenous pressure, shows that a combination of a deboronation procedure using a liquid solvent system (water) with a treatment with a liquid aqueous system (water) according to the invention, leads to a zeolitic material having an MWW framework structure with a molar ratio $B_2O_3$:$SiO_2$ which decreases from of 0.06:1 to 0.0008:1, and simultaneously allows to increase the crystallinity from 74% (or 77% after deboronation) to 85%.

Moreover, the water uptake of the zeolitic material which characterizes the hydrophobicity of the zeolitic material and, thus, an important chemical parameter of the zeolitic material, did not change significantly (12 weight-% for starting material, 10.7 weight-% of the product).

Comparative Example 1

Steam Treatment

A shallow bed sample of 100 g deboronated zeolitic material obtained according to Example 2 (ii) having a $B_2O_3$:$SiO_2$ molar ratio of 0.0022, a crystallinity of 77% and a water uptake of 12 weight-% was provided in a muffle oven and heated to 650° C. (temperature ramp 5 K/min). For the steam-treatment, a gas flow of 6 L/min (10% steam in air) was used, wherein the water dosing started at a temperature of 200° C. The steam-treatment was carried out for 1 h at 650° C.

The obtained material had a $B_2O_3:SiO_2$ molar ratio of 0.0026, a crystallinity of 74% and a water uptake of 9.7 weight-%. The multipoint BET specific surface area determined via nitrogen adsorption at 77 K according to DIN 66131 was 413 m²/g.

Thus, steaming the deboronated zeolitic material according to the prior art carried out for decreasing the $B_2O_3:SiO_2$ molar leads to a decrease in crystallinity, contrary to the process of the present invention which allows to keep the crystallinity constant of even increase the crystallinity.

Comparative Example 2

Steam Treatment

A shallow bed sample of 100 g deboronated zeolitic material obtained according to Example 2 (ii) having a $B_2O_3:SiO_2$ molar ratio of 0.0022, crystallinity of 77% and a water uptake of 12 weight-% was provided in a muffle oven and heated to 850° C. (temperature ramp 5° C./min). For the steam-treatment, a gas flow of 6 L/min (10% steam in air) was used, wherein the water dosing started at 200° C. The steam-treatment was carried out for 1 h at 850° C.

The obtained material had a $B_2O_3:SiO_2$ molar ratio of 0.0027, a crystallinity of 54 and a water uptake of 7.5 weight-%. The multipoint BET specific surface area determined via nitrogen adsorption at 77 K according to DIN 66131 was 397 m²/g.

Thus, steaming the deboronated zeolitic material according to the prior art carried out for decreasing the $B_2O_3:SiO_2$ molar leads to a decrease in crystallinity, contrary to the process of the present invention which allows to keep the crystallinity constant of even increase the crystallinity.

Cited Literature

EP 0 013 433 A1
WO 02/057181 A2
WO 2009/016153 A2

The invention claimed is:

1. A process for a post-treatment of a zeolitic material having an MWW framework structure, the process comprising
  (i) providing a zeolitic material (i) having an MWW framework structure, wherein the framework structure of the zeolitic material (i) comprises $X_2O_3$ and $YO_2$, wherein Y is Si and X is B and wherein a molar ratio $X_2O_3:YO_2$ is greater than 0.02:1;
  (ii) treating the zeolitic material (i) with a liquid solvent system thereby obtaining a zeolitic material having a molar ratio $X_2O_3:YO_2$ of at most 0.02:1, and at least partially separating the zeolitic material from the liquid solvent system to obtain a zeolitic material (ii);
  (iii) treating the zeolitic material (ii) with a liquid aqueous system having a pH in a range of 5.5 to 8 and a temperature of at least 75° C. in a closed system under autogenous pressure to obtain a zeolitic material (iii), thereby obtaining the zeolitic material having a molar ratio $X_2O_3:YO_2$ in the range of from 0.001:1 to 0.003:1, a crystallinity, as determined by XRD analysis, of at least 75% and a water uptake of at most 11 weight %;
  wherein the pH of the aqueous system used in (iii) is determined using a pH sensitive glass electrode, and wherein the treatment according to (ii) with the liquid solvent system reduces the molar ratio $X_2O_3:YO_2$ of the zeolitic material framework by at least partially removing X from the MWW framework structure
  wherein the IR spectrum of the zeolitic material of (iii) exhibits a first absorption band with a maximum in the range of from 3710 to 3750 cm$^{-1}$ and a second absorption band with a maximum in the range of from 3480 to 3540 cm$^{-1}$, wherein the ratio of the intensity of the first absorption band relative to the intensity of the second absorption band is at least 1.0.

2. The process of claim 1, wherein in (i), at least 95 weight-% of the framework structure of the zeolitic material consists of $X_2O_3$ and $YO_2$.

3. The process of claim 1, wherein in (i), the molar ratio $X_2O_3:YO_2$ is at least 0.03:1.

4. The process of claim 1, wherein in (i), the zeolitic material having the MWW framework structure is provided by a process comprising
  (a) hydrothermally synthesizing the zeolitic material from a synthesis mixture comprising at least one silicon source, at least one boron source, and at least one template compound to obtain the zeolitic material in a mother liquor;
  (b) separating the zeolitic material from the mother liquor.

5. The process of claim 4, wherein (b) comprises drying the zeolitic material.

6. The process of claim 4, wherein after (b) and prior to (ii), the zeolitic material is subjected to calcination.

7. The process of claim 6, wherein the calcination is carried out at a temperature in a range of from 400 to 700° C.

8. The process of claim 1, wherein in (ii), the liquid solvent system is selected from the group consisting of water, methanol, ethanol, propanol, ethane-1,2-diol,propane-1,2-diol, propane-1,3-diol, propane-1,2,3-triol, and a mixture of two or more thereof.

9. The process of claim 8, wherein in (ii), the treating is carried out at a temperature in a range of from 50 to 125° C.

10. The process of claim 9, wherein in (ii), the treating is carried out in an open system under reflux.

11. The process of claim 1, wherein in (ii), the zeolitic material (ii) is subjected to drying.

12. The process of claim 1, wherein in (ii), the zeolitic material (ii) is subjected to calcination.

13. The process of claim 1, wherein the zeolitic material (ii) has a molar ratio $X_2O_3:YO_2$ of at most 0.01 1.

14. The process of claim 1, wherein the zeolitic material (ii) is in a form of a powder.

15. The process of claim 1, wherein in (iii), the zeolitic material is treated with the liquid aqueous system for a period in a range of from 0.5 to 24 h.

16. The process of claim 1, wherein in (iii), the zeolitic material is treated with the liquid aqueous system at a temperature in a range of from 75 to 200° C.

17. The process of claim 1, wherein the liquid aqueous system used in (iii) has a pH in a range of from 6 to 7.5.

18. The process of claim 1, wherein in (iii), a weight ratio of the liquid aqueous system relative to the zeolitic material is in a range of from 35:1 to 5:1.

19. The process of claim 1, wherein in (iii), the liquid aqueous system comprises at least 90 weight-% water.

20. The process of claim 1, wherein in (iii), the zeolitic material is treated with the liquid aqueous system in an autoclave.

21. The process of claim 1, wherein in (iii), the zeolitic material (iii) is subjected to drying.

22. The process of claim 1, wherein in (iii), the zeolitic material (iii) is subjected to calcination.

23. The process of claim 1, wherein neither prior to nor during nor after (iii), the zeolitic material is subjected to one or more of a steam treatment and a treatment with an aqueous solution having a pH of below 5.5 or above 8.

24. A zeolitic material having an MWW framework structure, wherein the framework structure comprises $YO_2$ and $X_2O_3$, wherein Y is Si, and X is B, said zeolitic material having a molar ratio $X_2O_3:YO_2$ in the range of from 0.001:1 to 0.003:1, a crystallinity, as determined by XRD analysis, of at least 75% and a water uptake of at most 11 weight %, wherein said zeolitic material is obtained by a process comprising:
  (i) providing a zeolitic material having an MWW framework structure, wherein the framework structure of the zeolitic material comprises $X_2O_3$ and $YO_2$, wherein Y is a tetravalent element and X is a trivalent element and wherein a molar ratio $X_2O_3:YO_2$ is greater than 0.02:1;
  (ii) treating the zeolitic material in (i) with a liquid solvent system thereby obtaining a zeolitic material having a molar ratio $X_2O_3:YO_2$ of at most 0.02:1, and at least partially separating the zeolitic material from the liquid solvent system;
  (iii) treating the zeolitic material obtain from (ii) with a liquid aqueous system having a pH in a range of 5.5 to 8 and a temperature in the range of 75° C. to 200° C. in a closed system under autogenous pressure to obtain a zeolitic material (iii) and wherein the liquid aqueous system is in its liquid state;
  wherein the pH of the aqueous system in (iii) is determined using a pH sensitive glass electrode, wherein the treatment according to (ii) with the liquid solvent system reduced the molar ratio $X_2O_3:YO_2$ of the zeolitic material framework by at least partially removing X from the MWW framework structure
  wherein the IR spectrum of the zeolitic material of (iii) exhibits a first absorption band with a maximum in the range of from 3710 to 3750 $cm^-$ and a second absorption band with a maximum in the range of from 3480 to 3540 $cm^{-1}$, wherein the ratio of the intensity of the first absorption band relative to the intensity of the second absorption band is at least 1.0.

25. The zeolitic material of claim 24, wherein the crystallinity of the zeolitic material is in a range of from 75 to 90%, and wherein the water uptake of the zeolitic material is in a range of from 4 to 11 weight-%.

26. The zeolitic material of claim 24, wherein a $^{29}Si$—NMR spectrum of the zeolitic material comprises
  a first peak at −99.0 ppm +/−3.0 ppm,
  a second peak at −104.9 ppm +/−0.9 ppm,
  a third peak at −110.7 ppm +/−0.7 ppm,
  a fourth peak at −112.5 ppm +/−1.5 ppm,
  a fifth peak at −115.1 ppm +/−0.7 ppm, and
  a sixth peak at −118.9 ppm +/−0.7 ppm,
  wherein an integral of the sixth peak is at least 5% of a total integral.

27. The zeolitic material of claim 24, which is in a form of a powder.

28. The zeolitic material of claim 24, wherein the process does not comprise a steam treatment of a zeolitic material or treatment of a zeolitic material with an aqueous solution having a pH below 5.5 or above 8.

29. A catalyst, a catalyst precursor, or a catalyst component, comprising the zeolitic material according to claim 24.

* * * * *